June 2, 1964

R. D. JORDAN 3,135,289

MICRO CURRENT POSITION DETECTOR

Filed Sept. 1, 1960

INVENTOR.
ROBERT D. JORDAN

BY Toulmin & Toulmin

ATTORNEYS

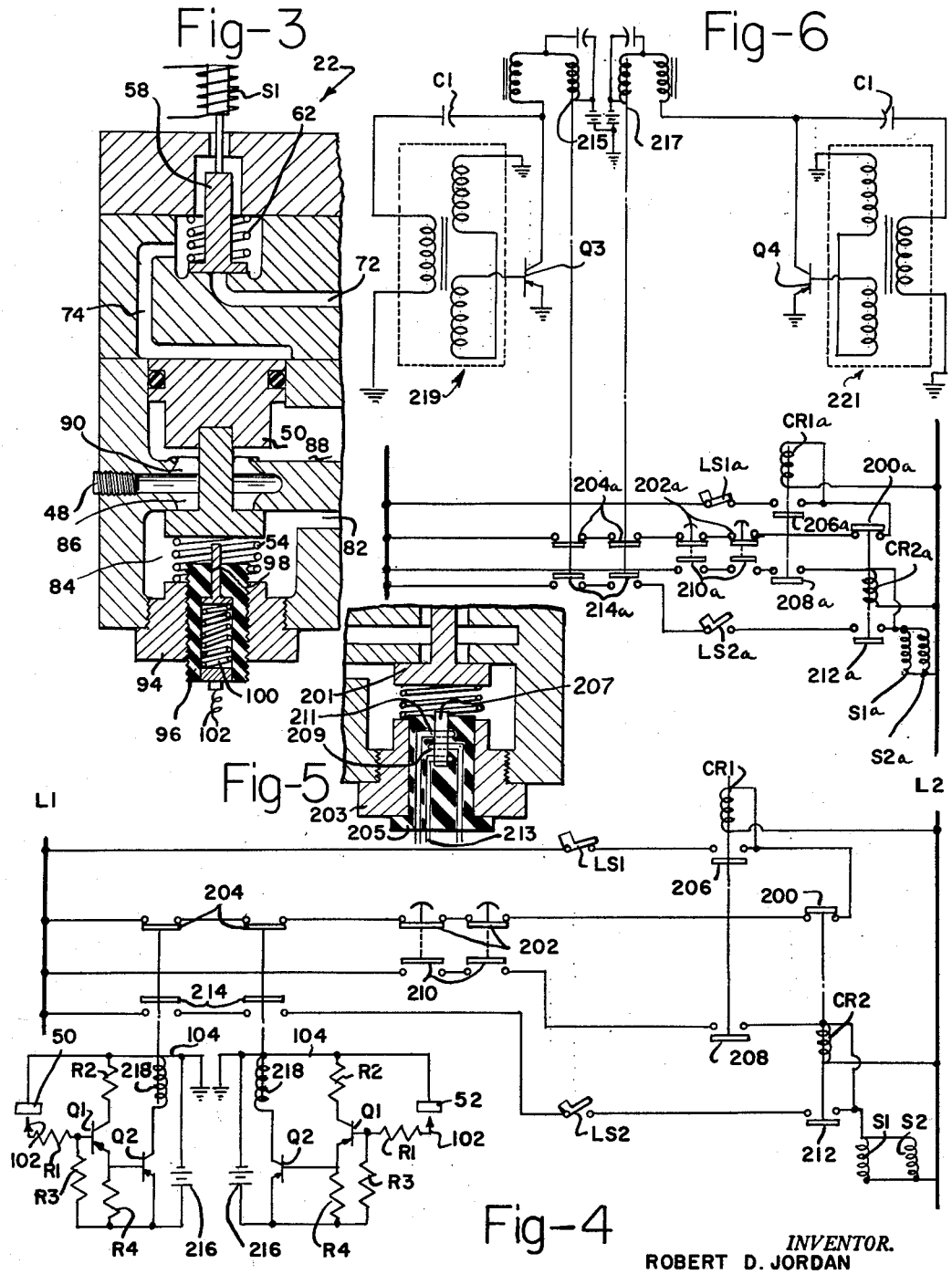

United States Patent Office 3,135,289
Patented June 2, 1964

3,135,289
MICRO CURRENT POSITION DETECTOR
Robert D. Jordan, St. Marys, Ohio, assignor to Minister Machine Company, Minister, Ohio, a corporation of Ohio
Filed Sept. 1, 1960, Ser. No. 53,522
4 Claims. (Cl. 137—596.16)

This invention relates to valves and controls therefor, and is particularly concerned with such valves and controls as applied to valve mechanism for controlling the operation of a press or the like through actuation of the clutch and brake thereof.

Most mechanical presses and press brakes and the like are operated by utilizing a clutch and brake combination which alternately clutches the crankshaft of the device to the flywheel and drive train and to the press frame. It is essential in arrangements of this nature for the valves to be absolutely positive in operation to avoid repeating of the press or press brake and to prevent accidental tripping thereof. Either of these conditions could lead to serious damage of the machine or dies therefor or injuries to the workmen operating the press or press brake.

It is a particular object of the present invention to provide a greatly improved valve arrangement and control therefor for circumstances of this nature.

A still further object of this invention is the provision of a dual valve arrangement for controlling clutches and brakes of presses and press brakes and the like in which the failure of either valve to operate properly will prevent the press or press brake from cycling.

Still another object of this invention is the provision of a detecting device for detecting the positions of the valves which will in no way interfere with the operation of the valves.

Another object of this invention is the provision of a detecting arrangement for detecting the positions of valves, particularly in a dual or tandem valve arrangement wherein the movable portion of the valve itself forms a portion of the detecting circuit.

A still further object of this invention is the provision of a detecting arrangement for detecting the positions of the valves, particularly in a dual or tandem valve arrangement for presses or press brakes or like machines in which the detecting means is substantially uneffected by vibration or shocks caused by operation of the machine or operation of the valves themselves.

Still another object of this invention is the provision of a detecting device for detecting the positions of valves which can be placed directly in a pressurized chamber without interfering with the operation of the device.

These and other objects and advantages will become more apparent upon reference to the drawings in which:

FIGURE 1 is a diagrammatic view showing a simple press structure adapted for being controlled by the valve structure of the present invention;

FIGURE 2 is a vertical section through the flywheel of the press of FIGURE 1 and showing in section the clutch and the brake and the tandem valve arrangement together with a portion of the valve position detecting circuit;

FIGURE 3 is a fragmentary view through a portion of the tandem valve showing one of the valves and the pilot valve therefor at enlarged scale;

FIGURE 4 is a diagrammatic view showing the detecting circuit and its relationship to the valve operating solenoids and the like of the press circuit control;

FIGURE 5 is a diagrammatic view showing the manner in which a differential transformer could be influenced by the positions of the valve members; and FIGURE 6 is a circuit similar to FIGURE 4 but showing the differential transformer of FIGURE 5 connected into the circuit.

Referring to the drawings somewhat more in detail, the press in FIGURE 1 comprises a frame 10 in which there is reciprocably mounted a platen 12 that is connected by a connecting rod 14 with a crankshaft 16 rotatably supported in the press frame. Crankshaft 16 supports a flywheel 18 driven by belts 20, or by any other suitable drive means such as a geared transmission leading to a drive motor.

Associated with the crankshaft and flywheel is a dual valve structure 22 consisting of a valve body means and valve member means movable therein for controlling the connection of the crankshaft to the flywheel and to the press frame.

The said connection of the crankshaft to the flywheel to cause the crankshaft to rotate or to the frame of the press to hold the crankshaft stationary is accomplished by clutches and brakes that are illustrated in FIGURE 2.

In FIGURE 2 it will be seen that flywheel 18 has a hub portion 24 supported on the projecting end 26 of crankshaft 16 by the antifriction bearings 28. The flywheel has attached thereto, preferably by spline means, clutch plates 30 and these plates are interleaved with clutch plates 32 splined to a hub member 34 that is fixed to the crankshaft.

Piston 36 is carried by hub portion 34 and is adapted for being moved rightwardly by a supply of pressure fluid thereto via conduit means 38 when it is desired to clamp the aforementioned clutch plates together to connect the flywheel with the crankshaft to drive the crankshaft in rotation.

When the piston is exhausted by connecting conduit 38 to exhaust, spring means 40 urges the piston in the opposite direction and at this time a brake plate 42 carried on the press frame 10 is clamped between the brake plates 44 carried by hub portion 34 and the crankshaft is brought to a halt and held stationary. The brake plates and clutch plates have friction elements interposed therebetween to enhance the gripping action thereof as the aforementioned position is operated in its opposite directions.

Conduit means 38 extends through the crankshaft and through a rotary coupling 46 to the service port 48 of the aforementioned valve structure 22. This valve structure comprises a pair of valve poppet members 50, 52, urged upwardly by their respective springs 54 and 56 and adapted for being moved downwardly by a supply of pressure to the upper ends thereof by actuation of their respective pilot valves 58 and 60. The pilot valves have the springs 62 and 64 respectively urging the pilot valves toward closed position and also have the actuating solenoids S1 and S2, respectively, which are energized for opening the pilot valves.

The supply of pressure fluid to valve 22 is by way of a conduit 66 connected to the inlet port 68 of the valve. A branch conduit 70 leading from conduit 66 effects a continuous supply of the pressure fluid to the conduit means 72 in the valve body that leads to the two pilot valves and which conduit means is normally closed off by the pilot valves when the pilot valves are closed.

Each pilot valve when opened connects conduit means 72 via the conduit means 74 with the upper face of the pertaining one of the dual pilot valve poppet members for moving the said poppet members downwardly against the bias of their springs.

The dual poppet valve members control the connection between inlet port 68 and service port 48 of the valve 22 and also control communication between the service port 48 and the exhaust port 76 of the valve.

Within the valve 22 there is a chamber 78 that communicates with inlet port 68 and in which chamber spring 56 of the poppet valve member 52 is located. This chamber communicates by way of a port 80 with a passage 82 in the valve leading to a chamber 84 associated with poppet valve 50 and corresponding to chamber 78 above referred to. Chambers 78 and 84 and the interconnecting passage 82 form an inlet passage leading from inlet port 68 to service port 48.

This chamber 84, in turn, communicates by way of a port 86 with the aforementioned service port 48. Each of the valve poppet members, when in its upper position as illustrated in FIGURE 2, closes its respective port leading from the said chambers 78, 84 thus preventing any communication between inlet port 68 and service port 48. It will also be evident that the poppet valve members are arranged in series in the inlet passage and that, therefore, both of the valve poppet members must be shifted downwardly in order to establish the aforementioned inlet passage and thus establish communication between the valve inlet port and the valve service port for supplying pressure to conduit means 38 in the crankshaft to actuate the press clutch.

The aforementioned exhaust port 76 leads from a chamber 88 in the valve and in which chamber is located the upper portions of the poppet valve members. This chamber also has a port 90 associated with poppet valve 50 communicating with service port 48 and a port 92 associated with poppet valve member 52 that communicates with the previously mentioned passage 82.

The poppet valve members, when moved downwardly by a supply of pressure to their upper ends as brought about by opening of their respective pilot valves, will engage and close their respective ports 90, 92. There is thus two parallel arranged exhaust passages leading from the service port 48 to exhaust.

It will be apparent that the exhaust chamber 88, and therefore the exhaust port 76, will be connected with the service port 48 of valve 22 when either of the poppet valve members are in their upper positions so that the conduit means 38 will be exhausted when either or both of the poppet valve members are in their upper positons to cause the press brake to be set.

According to this invention each of the chambers 78, 84, is closed at the bottom by a plug 94 in which plug is an insulating bushing 96. Reciprocably mounted in the upper end of each bushing is a conductive plunger 98 biased upwardly by a spring 100 that at its lower end has a connection with a wire 102.

The described arrangement forms a portion of the detector circuit and when the poppet valve members are moved downwardly they effect electrical connection with their respective plungers 98 and a circuit is thus established from the wires 102 into the valve member and thence to the valve body and then to a wire 104 connected with the valve body.

FIGURE 4 shows somewhat diagrammatically a preferred electrical control circuit by means of which the present invention can be practiced.

In FIGURE 4 the power lines are indicated at L1 and L2. Connected between these lines is the coil of a contactor CR1, with the circuit through the coil extending through a normally closed blade 200 of a second contactor CR2 and thence through the normally closed blades 202 of a pair of push button stations and then through the normally closed blades 204 of relays that are under the control of the valve position detectors referred to above.

The coil of CR1 also has a holding circuit extending through the normally open blade 206 of the relay and a limit switch LS1 associated with the press which is closed when the press is at the top of its stroke and which opens after the press commences its stroke.

The coil of relay CR2 is connected between power lines L1 and L2 in a circuit extending through a normally open blade 208 of relay CR1 and normally open blades 210 of the aforementioned push button stations. Connected in parallel with the coil of relay CR2 are the aforementioned valve solenoids S1 and S2.

A holding circuit for the coil of relay CR2 is established through a normally open blade 212 of relay CR2 and a limit switch LS2 which is open when the press is at the top of its stroke and which closes when the press commences its stroke and through the normally open blades 214 of the aforementioned relays that are under the control of the valve position detectors.

Each of the valves of the detector valve arrangement has a position detector circuit associated therewith. There are thus two identical detector circuits as illustrated in FIGURE 4, one pertaining to each of the relays referred to above.

In each circuit the wire 102 that is connected with the conductive pin that is engaged by the pertaining poppet valve member when the latter is moved downwardly is connected through a resistor R1 to the base of a transistor Q1. A resistor R3 is also connected between the base of the transistor Q1 and one side of a battery 216.

The same side of the battery is connected through a resistor R4 with the emitter of transistor Q1 and with the base of a second transistor Q2. The emitters of the transistor Q2 is directly connected with the said one side of battery 216.

The other side of battery 216 is connected with ground and also with the pertaining valve poppet valve member and through a resistor R2 with the collector of the transistor Q1 and also through the coil 218 of the pertaining relay with the collector of transistor Q2.

Since both of the detector circuits are identical, the same numbers and reference characters have been employed for both circuits in FIGURE 4 with the exception of the number applied to the valve poppet members.

The operation of each detector circuit is as follows:

The transistors are normally at cut off, no current flowing through them, since the base of Q1 is at the same potential as the emitter. Thus only leakage current is present in the collector-emitter circuit of Q1 and Q2 has very little base current, so that substantially only leakage current is present in the collector-emitter circuit of Q2.

When the valve pin 98 is contacted by the pertaining valve poppet member and is therefore grounded, current flow through this pin to ground is obtained largely through the base circuit of Q1, since R3 and R4 are relatively large compared to the emitter base impedances of Q1 and Q2 in series.

This current, of very small magnitude, for instance 100 micro-amperes, and relatively low voltage, for instance 12 volts, is multiplied by the amplification characteristics of transistor Q1, so that the collector-emitter circuit current of Q1 may be approximately 5 milliamperes. Substantially all of this current is obtained through the base of Q2 since its emitter base impedance is small compared to R4. Q2 further amplifies the current, enough to operate the relay coil in series with the emitter collector circuit Q2.

Thus when the valve poppet shifts to on position, the relay in the pertaining detector circuit is energized, and when the valve poppet is in the off position, it is deenergized.

With the machine at the top of the stroke, LS1 is closed and LS2 is open. When the electrical mains L1 and L2 are energized, CR1 will energize through the normally closed contacts of the valve position detector relays in series, the normally closed contacts of the manual switches, and a normally closed contact of CR2 relay. When energized, CR1 will hold through its own normally open contact and rotary limit switch LS1.

When CR1 is energized, and self holding, the manual switches may be depressed. CR2 and the valve solenoids will be energized through the normally open contacts of the manual switches in series, and a normally open CR1 contact in series.

With the valve engaged, the position detector relays are now energized, with their normally open contacts closed, and the machine clutch engaged by air through the valves. As the crankshaft turns, LS2 will close at a predetermined point, holding CR2 and the valve solenoids energized through the normally open contacts of the valve position detector relays in series, LS2 in series, and a normally open contact of CR2 in series. No holding path is formed if either of the valve detector switches has not operated. This is a protection circuit feature solely to assure that the detector circuits are working, since it was previously necessary to have both valves actually shifted in order that the clutch was supplied with air.

It is necessary that this CR2 holding circuit has continuity; if it does not, the machine will stop when the operator releases the manual switches, or even if these are held depressed, when LS1 opens de-energizing CR1, which opens the manual switch circuit originally used to energize CR2 and the valve solenoids.

When the end of the stroke is approached, LS2 opens to de-energize CR2 and the valve solenoids, causing the valve poppets to shift back to normal position, and the valve position detector relays to de-energize.

Then, CR1 again has an energizing circuit established, and the cycle may be re-enacted.

From the foregoing description of a cycle of operation it will be apparent that the use of the arrangement of the present invention makes for an unusually safe press operation system. The dual valve press operating system assumes that there will be no more than a single failure in any given press cycle. Since all parts of the valve device are inherently free of failure, only under rare circumstances will a single failure occur.

Accordingly, the probability of multiple failures, as must occur with the present invention to cause a failure of the proper operation of the press, is extremely small.

Turning now to FIGURES 5 and 6, there is shown therein more or less diagrammatically an arrangement for detecting the position of the valve poppet members by the positional relation thereof to an element, which may, for example, be a differential transformer. With an arrangement of this nature no actual contacting of a switch or plunger or the like is necessary in order to determine the positions of the valve poppet members.

In FIGURE 5 there is shown a fragment of the dual poppet valve with the lower end of one of the valve members indicated at 201. In the plug 203 in the bottom of the valve body is an insulating member 205 and mounted in the insulating member is a differential transformer consisting of a bar core 207 having primary winding 209 thereon located between the secondary windings 211 and 213 which are wound in opposition.

With the valve poppet member in its upper position, the net coupling between the primary winding and the total secondary winding consisting of the two secondary windings in opposing series would be zero. However, movement of the valve poppet member downwardly would disturb the magnetic balance in the core and would increase the coupling of the primary to the secondary winding 211 and the unbalance resulting could be employed in a circuit for indicating the position of the poppet member.

A circuit employing differential transformers of the nature referred to is illustrated more or less diagrammatically in FIGURE 6.

This circuit is identical with the circuit of FIGURE 5 with the exception of the actuation of the relays that are operated by the valve position detecting devices. For that reason the same reference numerals are employed in FIGURE 6 that are employed in FIGURE 4 with the addition of a subscript *a*.

With reference to the relays operated by the valve position detector, these are identified in FIGURE 6 at 215 and 217.

In the circuit of FIGURE 6 the differential transformers for the two poppet valve members are indicated generally at 219 and 221. Each of these transformers is connected in an oscillating circuit with transistors Q3 and Q4, respectively.

By selecting the correct ratio of winding turns and the correct amount of circuit disturbance for a given transistor gain, the entire circuit will oscillate with the frequency depending upon the number of turns of the primary winding and the capacity of condenser C1 in each circuit.

Before oscillation the transistors are operating at cutoff, and only leakage collector current flows in the relay coil. After oscillation begins, indicating that the respective valve poppet member is shifted downwardly, a much greater current flows. By properly designing the circuit constants this increased current can be made large enough to operate the relay. Operation of the relays control the circuit in exactly the same manner as operation of the corresponding relays in the FIGURE 4 arrangement.

The use of a differential transformer is of merit because it can be placed directly in a pressure chamber and it is not influenced by changes of pressure therein. The transformer can be made quite small, for example, with a $\frac{1}{16}''$ x $\frac{1}{16}''$ x $\frac{3}{8}''$ magnetic bar core. The windings are placed on this core in the manner described and this small unit can then be installed directly within the pressure chamber if so desired.

It will be understood that the illustration of the differential transformer in FIGURE 5 is diagrammatic and the proportions thereof have been distorted in order to make a clear showing of the bar core and the several windings thereon.

It will also be understood that the circuit of FIGURE 6 is exemplary of many different control circuits that could be utilized employing the differential transformer means. The differential transformers constitute means for introducing a disturbance into, or for changing the conditions in, a circuit in response to movement of the valve members and any circuit capable of amplifying such disturbance or change to create sufficient current to operate the relays could be employed.

It will be understood that this invention is susceptible to modification in order to adapt it to different usages and conditions; and, accordingly, it is desired to comprehend such modifications within this invention as may fall within the scope of the appended claims.

I claim:

1. In an electric control circuit for controlling the operation of a pair of poppet valves arranged in series in a valve body member having an inlet port, a service port, and an outlet port therein, each of said valves being yieldably urged toward a first position which establishes a passage between said service port and said outlet port, said poppet valves being shiftable to a second position which both of the valves must occupy to establish a passage between said inlet port and said service port, a pilot valve for each poppet valve which is yieldably urged toward closed position, solenoid actuated means for each pilot valve which is energized for opening the pilot valve to cause the respective poppet valve to move to said second position, a detector circuit including a relay means for each poppet valve and operable when energized for energizing the pertaining one of said relay means, a contact element in each detector circuit positioned in said valve body member and adapted for actuation upon movement of the respective poppet valve to said second position, each said detector circuit extending through the pertaining poppet valve and the pertaining contact element whereby movement of each poppet valve to its said second position will energize the pertaining detector circuit, blade means on each of said relay means in said control circuit, and contactor means having actuating coil means in said control circuit and having blade means in circuit with said solenoid actuated means.

2. An electric control circuit according to claim 1, in which each detector circuit includes current amplifying means interposed in the detector circuit between said contact element and poppet valve on the one hand and said relay means on the other hand.

3. An electric control circuit according to claim 2, in which said current amplifying means includes transistor means.

4. An electric control circuit according to claim 1, in which each said detector circuit includes therein current amplifying means, said current amplifying means comprising a first transistor connected in series with said relay means, and a second transistor having its emitter connected to the base of said first transistor, said second transistor having its base connected to one of said contact element and poppet valve and having its collector connected to the other of said contact element and poppet valve.

References Cited in the file of this patent

UNITED STATES PATENTS

| | | |
|---|---|---|
| 2,636,581 | Bitler | Apr. 28, 1953 |
| 2,725,890 | Kanuch | Dec. 6, 1955 |
| 2,754,840 | Hicks | July 17, 1956 |
| 3,043,335 | Hunt | July 10, 1962 |